United States Patent
Tanaka et al.

(10) Patent No.: US 6,594,428 B1
(45) Date of Patent: Jul. 15, 2003

(54) DISPERSION COMPENSATING OPTICAL TRANSMISSION LINE AND SYSTEM

(75) Inventors: Keiji Tanaka, Kamifukuoka (JP); Takehiro Tsuritani, Kamifukuoka (JP); Noboru Edagawa, Kamifukuoka (JP); Masatoshi Suzuki, Kamifukuoka (JP)

(73) Assignees: KDD Corporation, Tokyo (JP); KDD Submarine Cable Systems Inc., Tokyo (JP)

( * ) Notice: Subject to any disclaimer, the term of this patent is extended or adjusted under 35 U.S.C. 154(b) by 0 days.

(21) Appl. No.: 09/520,481

(22) Filed: Mar. 8, 2000

(30) Foreign Application Priority Data

Mar. 9, 1999 (JP) .......................................... 11-062344

(51) Int. Cl.[7] .............................. G02B 6/16; G02B 6/26
(52) U.S. Cl. ............................ 385/123; 385/24; 385/27
(58) Field of Search ............................. 385/15, 27, 31, 385/123, 124, 43, 24

(56) References Cited

U.S. PATENT DOCUMENTS

| | | | |
|---|---|---|---|
| 5,218,662 A | * 6/1993 | Dugan | 385/123 |
| 5,361,319 A | 11/1994 | Antos et al. | 385/123 |
| 5,696,614 A | 12/1997 | Nishikawa et al. | |
| 5,777,770 A | 7/1998 | Naito | |
| 5,781,673 A | 7/1998 | Reed et al. | |
| 5,877,881 A | 3/1999 | Miyauchi et al. | |
| 5,940,207 A | 8/1999 | Weich et al. | |
| 5,991,477 A | 11/1999 | Ishikawa et al. | |
| 6,021,235 A | * 2/2000 | Yamamoto et al. | 385/24 |
| 6,043,914 A | 3/2000 | Cook et al. | |

FOREIGN PATENT DOCUMENTS

| | | |
|---|---|---|
| EP | 0554 714 A1 | 8/1993 |
| EP | 0 701 340 A2 | 3/1996 |
| EP | 0 701 340 A3 | 11/1996 |
| EP | 0 777 347 A2 | 6/1997 |
| EP | 1 035 671 A2 | 9/2000 |
| FR | 2 761 839 | 10/1998 |
| GB | 2 309 131 | 7/1997 |
| JP | 6-11620 | 1/1994 |
| JP | 08237222 | 9/1996 |
| JP | 10-221562 | 8/1998 |
| JP | 2000-31902 | 1/2000 |
| JP | 2000-82995 | 3/2000 |

OTHER PUBLICATIONS

D. Le Guen, et al., "Narrow Band 640 Gbit/s Soliton WDM Transmission over 1200 km of Standard Fibre with 100 km −21dB Amplifier Spans", ECOC '98, Sep. 20–24, 1998, pp. 61,63, Madrid, Spain.

(List continued on next page.)

Primary Examiner—John D. Lee
(74) Attorney, Agent, or Firm—Christie, Parker & Hale, LLP

(57) ABSTRACT

A dispersion compensating optical transmission line comprises a plurality of optical transmission fibers for transmitting signal light, at least one first dispersion compensator disposed at a first dispersion compensating cycle for compensating an accumulated chromatic dispersion of the signal light so that an average chromatic dispersion is equal to a first desired value, and a plurality of second dispersion compensators disposed at a second dispersion compensating cycle shorter than the first dispersion compensating cycle for compensating the accumulated chromatic dispersion of the signal light so that an average chromatic dispersion is equal to a second desired value which absolute value is larger than that of the first desired value.

43 Claims, 9 Drawing Sheets

OTHER PUBLICATIONS

M. Murakami et al, Long–Haul 16×10 WDM Transmission Experiment Using Higher Order Fiber Dispersion Management Technique, ECOC 1998, Sep. 20–24, 1998, pp. 313–314.

T. Matsuda et al, 340 Gbit/s (34×10 Gbit/s) WDM transmission over 8,514km using broadband gain equalisation technique for transoceanic systems, Electronics Letters, Jun. $24^{th}$ 1999, vol. 35, No. 13, pp. 1090–1091.

T. Tanaka et al, 2.1–Tbit/s WDM Transmission Over 7,221 km With 80–km Repeater Spacing; ECOC 2000, Sep. 3–7, 2000, 4 pages.

I. Morita et al, 40 Gb/s Single–Channel Soliton Transmission Over Transoceanic distances by Reducing Gordon–Haus Timing Jitter and Soliton–Soliton Interaction, Journal of Lightwave Technology, vol. 17, No. 12, Dec. 1999, pp. 2506–2511.

I. Morita et al, 40 Gbit/s×16 WDM Transmission Over 2000 KM Using Dispersion Managed Low–Nonlinear Fiber Span, ECOC 2000, Sep. 3–7, 2000, pp. 25–27 (5 pages total).

M. Suzuki et al, 20 Gbit/s–based soliton WDM transmission over transoceanic distances using periodic compensation of dispersion and its slope, Electronics Letters, Apr. $10^{th}$ 1997, vol. 33, No. 8, pp. 691–692.

H. Taga et al, 213 Gbit/s (20×10.66 Gbit/s) over 9000 km Transmission xperiment using Dispersion Slope Compensator, OFC 1998, pp. PD13–1 —PD13–4.

T. Naito et al, 1 Terabit/s WDM Transmission over 10,000 km, ECOC 1999, pp. 24–25.

European Search Report for Application No. 00103973.4 (Dated Jul. 5, 2001).

Taga, H. et al; "20 WDM, 10.66 Gbit/s transmission experiment over 9000 km using periodic dispersion slope compensation"; Electronics Letters, IEE Stevenage, GB, vol. 34, No. 5, Mar. 5, 1998, pp. 476–478.

Kikuchi, N. et al; "Analysis of cross–phase modulation (XPM) effect on WDM transmission performance"; Electronics Letters, IEE Stevenage, GB, vol. 33, No. 8, Apr. 10, 1997, pp. 653–654.

European Search Report, Application No. 02001696.0 dated Jul. 19, 2002.

* cited by examiner

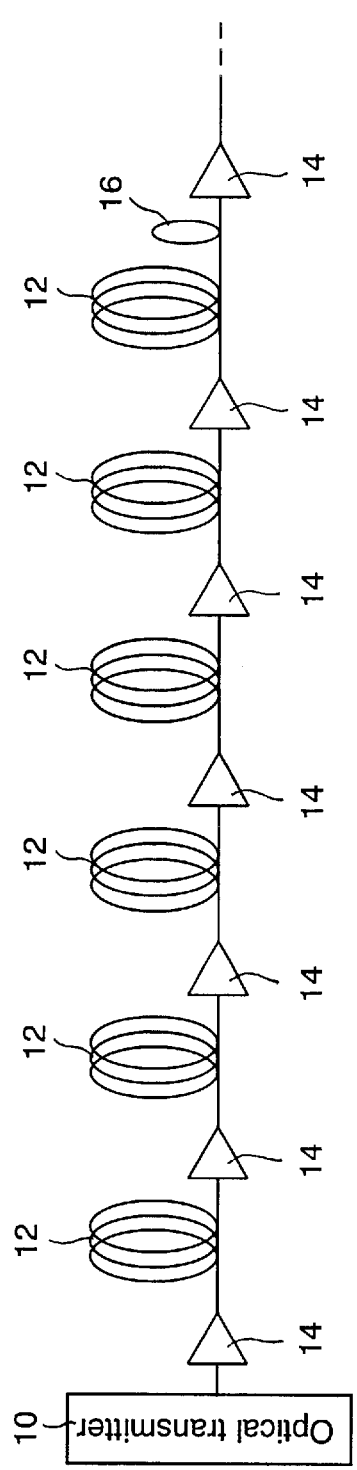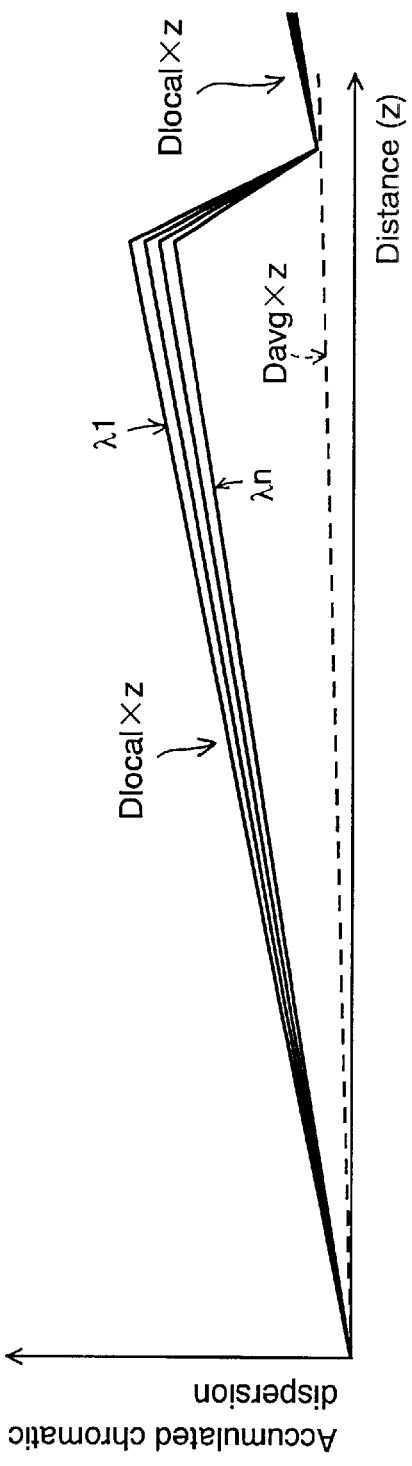
FIG. 2 (A)
FIG. 2 (B)

DISPERSION COMPENSATING OPTICAL TRANSMISSION LINE AND SYSTEM

FIELD OF THE INVENTION

This invention relates to a dispersion compensating transmission line and system, and more specifically to a dispersion compensating optical transmission line and system capable of long haul transmission of wavelength-division-multiplexed (WDM) signal light.

BACKGROUND OF THE INVENTION

In a long haul optical amplification transmission system, dispersion compensation fibers are disposed at appropriate intervals in order to control an accumulated chromatic dispersion within a predetermined value (cf. Japanese Patent Laid-open publication No. Heisei 6-11620 or U.S. Pat. No. 5,361,319).

In wavelength-division-multiplexing optical transmission widely noticed as a method for increasing a transmission capacity, since a chromatic dispersion of an optical transmission fiber differs according to respective wavelengths (dispersion slope), an accumulated chromatic dispersion of each wavelength becomes also different. Firstly, proposed was a configuration that compensated differences of accumulative chromatic dispersion values among the wavelengths at a receiving or transmitting side. However, the dispersion amount practically compensated at the transmitting or receiving side is quite limited. Furthermore, an allowable difference of the dispersion values tends to decrease as a transmission rate per wavelength increases.

Then secondly proposed was an optical transmission system wherein each optical repeating span is composed of a single mode optical fiber having a zero dispersion wavelength at a 1.3 $\mu$m band and a slope compensating dispersion compensation fiber for compensating both of its chromatic dispersion and dispersion slope; namely a difference of accumulative chromatic dispersions among wavelengths (cf. op. cit. Japanese Patent Laid-open publication No. Heisei 6-11620 or U.S. Pat. No. 5,361,319 and D. Le Guen et al., "Narrow Band 640 Gbit/s Soliton WDM transmission over 1200 km of Standard Fibre with 100 km 21 dB Amplifier Spans", ECOC '98, September 1998, Postdeadline papers, pp. 61–63).

FIGS. 2(A) and 2(B) show an optical transmission line for compensating an accumulated chromatic dispersion according to a cycle of several repeating spans and a distance variation of the accumulated chromatic dispersion. A dispersion slope compensating dispersion compensation fiber for compensating the dispersion slope at the same time is employed in the embodiment. FIG. 2(A) shows the configuration of the transmission line and FIG. 2(B) shows the distance variation of the accumulated chromatic dispersion corresponding to the transmission line shown in FIG. 2(A). Reference numeral 10 denotes an optical transmitter for outputting signal light and reference numeral 12 denotes an optical transmission fiber comprising a single mode optical fiber (a dispersion shifted fiber) having a zero dispersion wavelength at a 1.5 $\mu$m band. Reference numerals 14 and 16 respectively denote an optical repeating amplifier and a slope compensating dispersion compensation fiber (SCDCF) for reducing accumulated chromatic dispersion values of respective wavelengths λ1–λn into a predetermined value. The dispersion compensation fibers 16 are disposed at a plurality of the optical repeating intervals. The slope compensating dispersion compensation fiber 16 comprises, for instance, a fiber in which polarities of its chromatic dispersion value and dispersion slope are both reverse to those of the optical transmission fiber 12.

Davg indicates a desired chromatic dispersion value of the whole system. A desired value of dispersion compensation by each dispersion compensation fiber 16 is derived by multiplying the desired value Davg by a transmission distance z from a starting point. Dlocal shows a chromatic dispersion value before the dispersion compensation by the dispersion compensation fiber 16, namely the chromatic dispersion value of the optical transmission fiber 12. The accumulated chromatic dispersion increases at the coefficient Dlocal according to the transmission distance. The dispersion compensation fiber 16 reduces, namely compensates the accumulated chromatic dispersion of each wavelength into a value obtained by multiplying Davg by the transmission distance z. Dlocal generally varies according to a wavelength.

In long haul transmission, since nonlinear effect exists to no small extent, an average chromatic dispersion value Davg of a whole system is generally set low other than zero in order to balance the nonlinear effect with the chromatic dispersion value.

FIGS. 3(A) and 3(B) show a conventional transmission line for compensating an accumulated chromatic dispersion at an optical amplification repeating cycle, and a distance variation of the accumulated chromatic dispersion respectively. FIG. 3(A) shows the transmission line and FIG. 3(B) shows the distance variation of the accumulated chromatic dispersion on the transmission line shown in FIG. 3(A). Reference numerals 20 and 22 respectively denote an optical transmitter for outputting signal light and an optical amplification repeater, reference numeral 24 denotes an optical transmission fiber composed of a single mode optical fiber having a zero dispersion wavelength at a 1.3 $\mu$m band, and reference numeral 26 denotes a slope compensating dispersion compensation fiber (SCDCF). The optical transmission fiber 24 and slope compensating dispersion compensation fiber (SCDCF) 26 are inserted in each optical repeating span formed by the optical amplification repeater 22. That is, the dispersion compensating cycle is equal to the optical amplification repeating cycle.

A nonlinearity of an optical fiber is generally expressed as $n_2/A_{eff}$. The reference symbols $n_2$ and $A_{eff}$ denote a nonlinear constant and an effective core area respectively. The nonlinearity $n_2/A_{eff}$ of a SCDCF is larger than that of a standard single mode optical fiber. In a conventional system that the dispersion compensation fibers 26 are inserted at frequent intervals, the nonlinear effect, which affects the transmission characteristics, becomes larger. In order to perform the long haul transmission while balancing the nonlinear effect with the chromatic dispersion value, the chromatic dispersion value Davg after the dispersion compensation by the dispersion compensation fiber 26, namely the chromatic dispersion value of the whole system should be set relatively high.

As already mentioned above, because the nonlinear effect exists to no small extent in long haul transmission such as transoceanic transmission, the average chromatic dispersion value Davg of the whole system preferably should be a low value other than zero for balancing the nonlinear effect with the chromatic dispersion value.

In the conventional system shown in FIGS. 2(A) and 2(B), the dispersion-shifted fiber is employed as the optical transmission fiber. The chromatic dispersion value of the dispersion-shifted fiber is low at the 1.5 $\mu$m band and therefore the influence due to the nonlinearity becomes relatively too large. To put it concretely, in the WDM transmission, owing to the lowness of the local chromatic dispersion value at the interval before the dispersion compensation by the dispersion compensation fiber 16, each interaction length among the respective wavelengths becomes too long causing the large influence of cross phase modulation (XPM), which makes the stable long haul transmission impossible.

On the other hand, when a single mode fiber, which chromatic dispersion value is high at the 1.5 μm band, is employed as the optical transmission fiber 12, each interaction length among the respective wavelengths of the WDM signal light is shortened and thus the influence of the XPM is also suppressed. However, in order to control the accumulated chromatic dispersion value (the absolute value) within a predetermined value, the dispersion compensation fibers 14 should be inserted at shorter intervals. In other words, the dispersion compensating cycle should be shorter and consequently this configuration becomes more similar to that shown in FIG. 3(A).

In the conventional system shown in FIGS. 3(A) and 3(B), on account of employing the single mode optical fiber, which has the zero dispersion wavelength at the 1.3 μm band, as the optical transmission fiber 24, the local chromatic dispersion value becomes high. Accordingly, each interaction length among the respective wavelengths of the WDM signal light is shortened and thus the influence of the XPM is also suppressed. However, due to the frequent insertion of the dispersion compensation fibers 26, the nonlinear effect of the whole system grows large. When such a large nonlinear effect is balanced with the chromatic dispersion value, the chromatic dispersion value Davg after the dispersion compensation becomes excessively high. As a result, the large chromatic dispersion value, conversely, becomes a problem and makes the transmission characteristics deteriorated. Specifically, the troubles most likely to be occurred are jitter and dispersion endurance. These troubles are most serious in long haul transmission such as transoceanic transmission.

SUMMARY OF THE INVENTION

An object of the present invention is to provide an optical dispersion compensating transmission line and system for transmitting WDM signal light steadily over a long haul.

According to the present invention, at least one first dispersion compensator disposed at a first dispersion compensation cycle compensates an accumulated chromatic dispersion of signal light so that an average chromatic dispersion is equal to a first desired value and a plurality of second dispersion compensators disposed at a second dispersion compensating cycle shorter than the first dispersion compensating cycle compensate the accumulated chromatic dispersion of the signal light so that an average chromatic dispersion is equal to a second desired value which absolute value is larger than that of the first desired value.

By this configuration, satisfactory transmission characteristics can be obtained within the first dispersion compensating cycle as well as the control of the chromatic dispersion of the whole transmission system can be simplified.

BRIEF DESCRIPTION OF THE DRAWING

FIGS. 2(A) and 2(B) show a schematic block diagram of a conventional system and a distance variation of its accumulated chromatic dispersion respectively;

DESCRIPTION OF THE PREFERRED EMBODIMENT

Embodiments of the present invention are explained below in detail with reference to the drawings.

Figure 1:
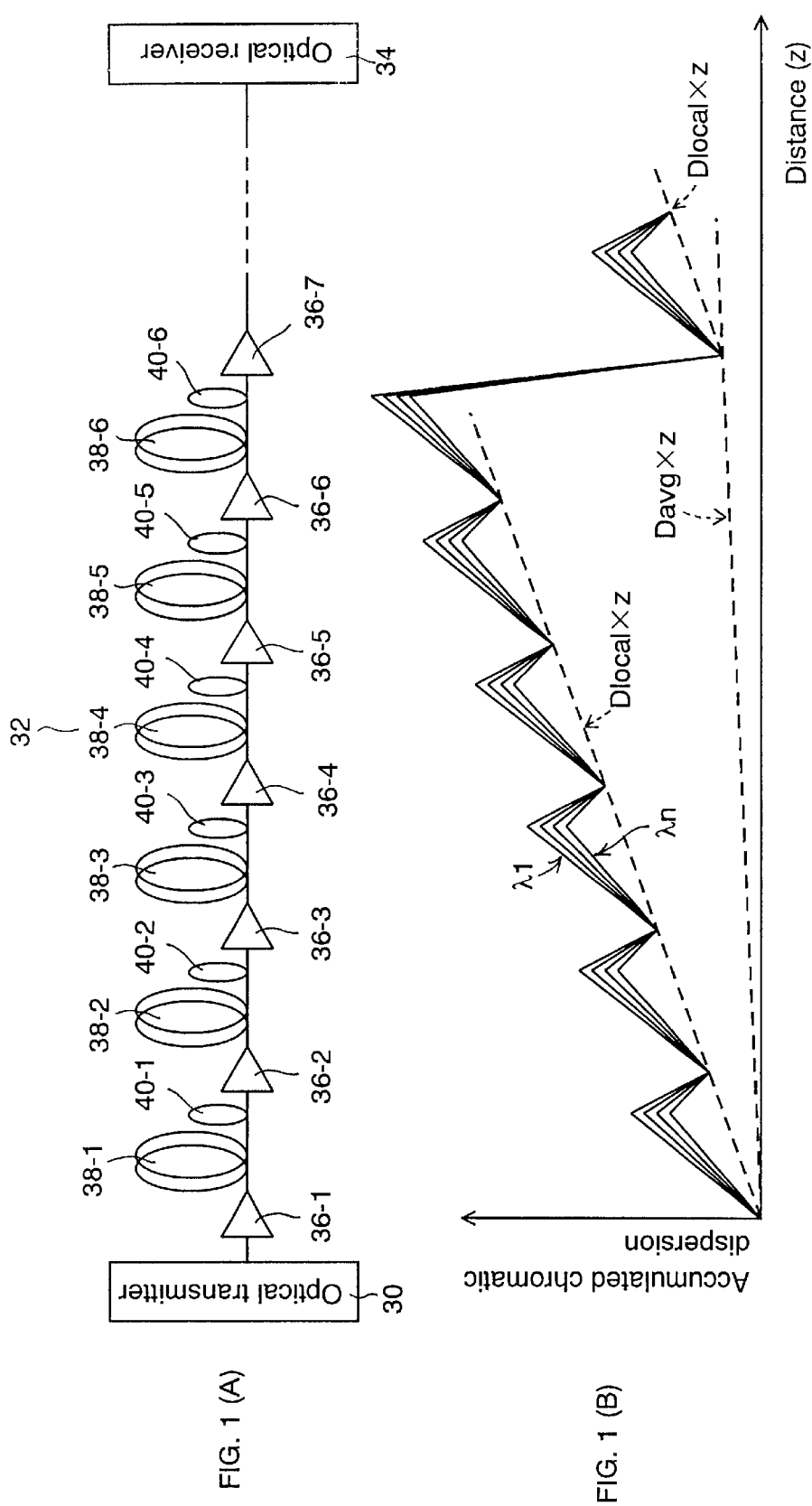
FIGS. 1(A) and 1(B) show a schematic block diagram according to a first embodiment of the invention and a distance variation of its accumulated chromatic dispersion respectively.
Figure 3:
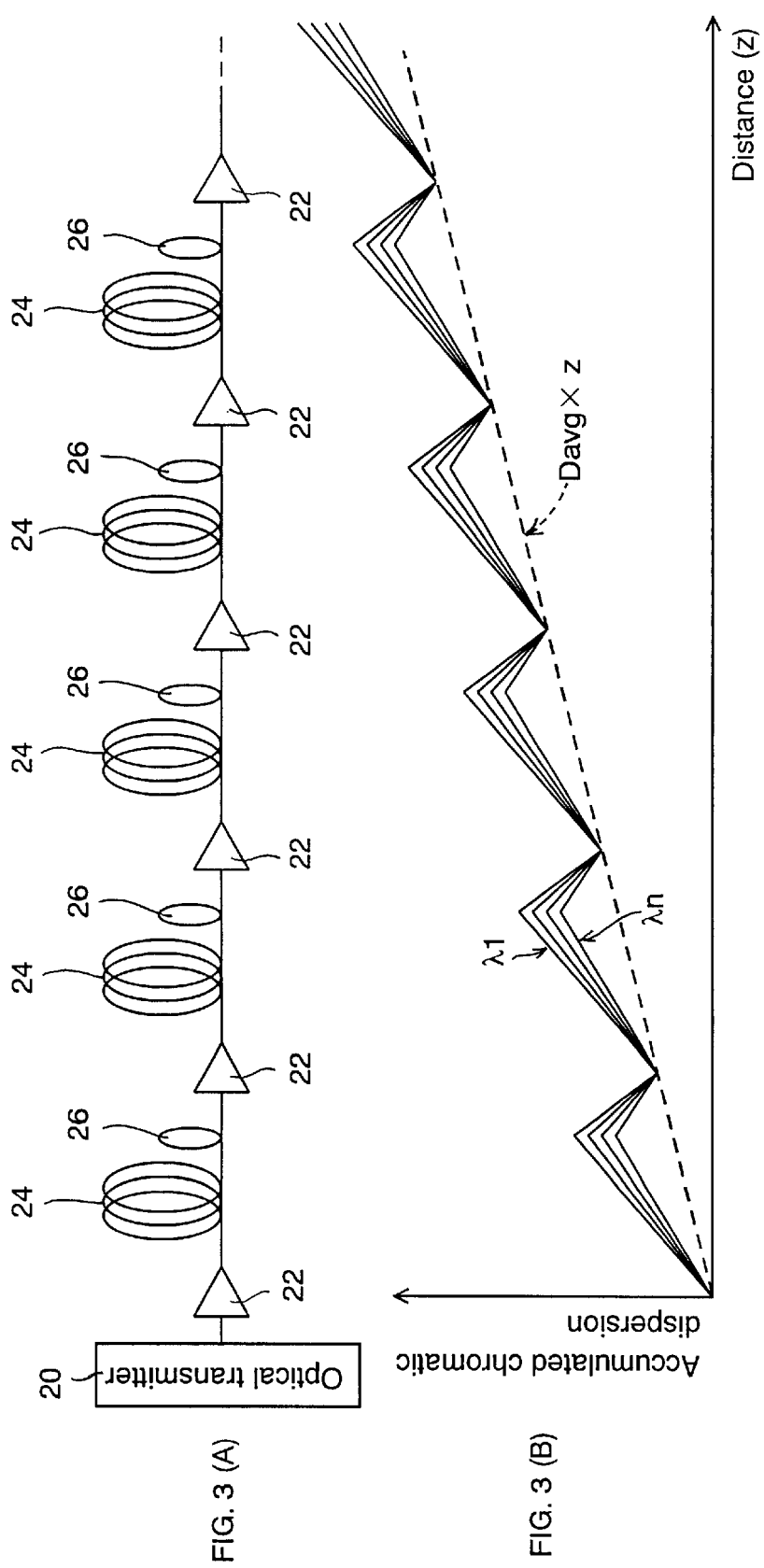
FIGS. 3(A) and 3(B) show a schematic block diagram of another conventional system and a distance variation of its accumulated chromatic dispersion respectively.

FIG. 1(A) shows a schematic block diagram according to a first embodiment of the invention and FIG. 1(B) shows a distance variation of its accumulated chromatic dispersion.

Reference numeral 30 denotes an optical transmitter for outputting WDM signal light onto an optical transmission line 32, and 34 denotes an optical receiver for receiving the WDM signal light propagated on the optical transmission line 32. The optical transmission line 32 comprises optical repeating amplifiers 36 (36-1, 36-2 . . . ), optical transmission fibers 38 (38-1, 38-2 . . . ) and slope compensating dispersion compensation fibers 40 (40-1, 40-2 . . . ) for compensating an accumulated chromatic dispersion of signal light of respective wavelengths λ1–λn into a desired value. The optical transmission fibers 38 and dispersion compensation fibers 40 are inserted within respective repeating spans formed by the optical repeating amplifiers 36.

In the embodiment, as shown in FIG. 1(B), two kinds of chromatic dispersion values of Dlocal and Davg are provided as desired values of the dispersion compensation by the dispersion compensation fibers 40, and it is determined that six repeating spans compose a dispersion compensating cycle of the Davg (the first dispersion compensating cycle) and each one of five repeating spans out of the six forms a dispersion compensating cycle of the Dlocal (the second dispersion compensating cycle). As obvious from FIG. 1(B), the Dlocal is larger than the Davg. The Dlocal indicates the desired chromatic dispersion value of the dispersion compensation within the second dispersion compensating cycle. The Davg indicates the desired chromatic dispersion value of the dispersion compensation in the whole transmission line 32. Practically speaking, it depends on an actual configuration of an optical transmission line to determine the number of repeating spans composing the first dispersion compensating cycle.

More concretely, up to the first five repeating spans in the first dispersion compensating cycle, dispersion compensation fibers 40 (dispersion compensation fibers 40-1~40-5 in FIG. 1(A)) compensate accumulated chromatic dispersions (and dispersion slopes) of respective wavelengths λ1–λn so that chromatic dispersion values of the respective wavelengths λ1-λn after the dispersion compensation become the Dlocal. In other words, the dispersion compensation fibers 40-1~40-5 compensate the accumulated chromatic dispersions (and dispersion slopes) of the respective wavelengths λ1-λn so that each accumulated chromatic dispersion of the respective wavelengths λ1-λn after the dispersion compensation varies at an incline of the Dlocal according to the distance z. The dispersion compensation fiber 40-6 belonged to the last repeating span in the six repeating spans compensates the accumulated chromatic dispersions (and dispersion slopes) of the respective wavelengths λ1-λn so that the chromatic dispersion values of the respective wavelengths λ1-λn after the dispersion compensation become the Davg. That is, the dispersion compensation fiber 40-6 reduces each of the accumulated chromatic dispersions of the respective wavelengths λ1-λn into a value equal to the product derived from multiplying the Davg by the transmission distance, namely Davg ×z.

The aforementioned six repeating spans make a basic unit and the same configuration continues repeatedly on a subsequent optical transmission line as far as the optical receiver 34.

The optical transmission fiber 38 comprises for example a single mode optical fiber having a zero dispersion wavelength at a 1.3 μm band. It is also applicable that the optical transmission fiber 38 in the second dispersion compensating cycle, specifically in one repeating span, comprises a single mode optical fiber having the zero dispersion wavelength at the 1.3 μm band (e.g. an optical fiber of a chromatic dispersion value +18 ps/nm/km) and a minus dispersion optical fiber or a plus dispersion optical fiber with a small dispersion value connected to the single mode fiber, and then the minus dispersion optical fibers 40-1~40-5 for compensating the dispersion slopes and chromatic dispersions are connected to the fiber 38. It is also preferable to gradually change the chromatic dispersion of the optical transmission fiber 38 disposed immediately before the dispersion compensation fiber 40-6. Owing to the gradual change, the increase of the accumulated chromatic dispersion in one repeating span is efficiently suppressed and thus the transmission characteristics can be improved.

Also, when the optical transmission fiber 38 comprises a plurality of optical fibers, it is preferable to dispose each optical fiber so that its effective core area gradually reduces in the transmission direction of the signal light as well as its chromatic dispersion value approaches, in the transmission direction of the signal light, to the chromatic dispersion values of the dispersion compensation fibers 40-1~40-5 on the downstream side. By this configuration, when entering the dispersion compensation fibers 40-1~40-5, the signal light can avoid both sudden decline of its effective core area and sudden change of its chromatic dispersion value. The optical transmission fiber 38-6 disposed immediately before the dispersion compensation fiber 40-6 also should have the same configuration.

The WDM signal light output from the optical transmitter 30 is optically amplified at the optical repeating amplifier 36 while propagating on the optical transmission fiber 38 and dispersion compensation fiber 40, and finally enters the optical receiver 34. The dispersion compensation fiber 40 compensates the accumulated chromatic dispersion of each wavelength light (wavelengths λ1-λn) as shown in FIG. 1(B).

The above configuration makes it possible to control the chromatic dispersion value Davg of the whole transmission system to be low while keeping the local chromatic dispersion value high. As a result, in the WDM transmission, each interaction length among the respective wavelengths can be shortened as well as the chromatic dispersions can be easily controlled, and consequently the total transmission characteristics are improved. In other words, the chromatic dispersion is balanced with the nonlinear effect from both macroscopic and microscopic views; microscopically, the transmission characteristics of the WDM signal light are improved by increasing the chromatic dispersion value and, macroscopically, the dispersion management becomes easier by controlling the excessive increase of the accumulated chromatic dispersion.

The following configuration is also applicable that the signal light is given a chromatic dispersion in a minus direction beforehand and output onto the optical transmission line. Accordingly, the signal light receives an effect similar to a phase modulation and thus it is not necessary to dispose a phase modulator at the optical transmitter or a phase modulation degree can be reduced even if a phase modulator is required. Furthermore, spectral spreading can be avoided and a channel interval can be narrowed. This is especially effective in an optical transmission system of long haul or ultra long haul such as transoceanic transmission.

Figure 4:
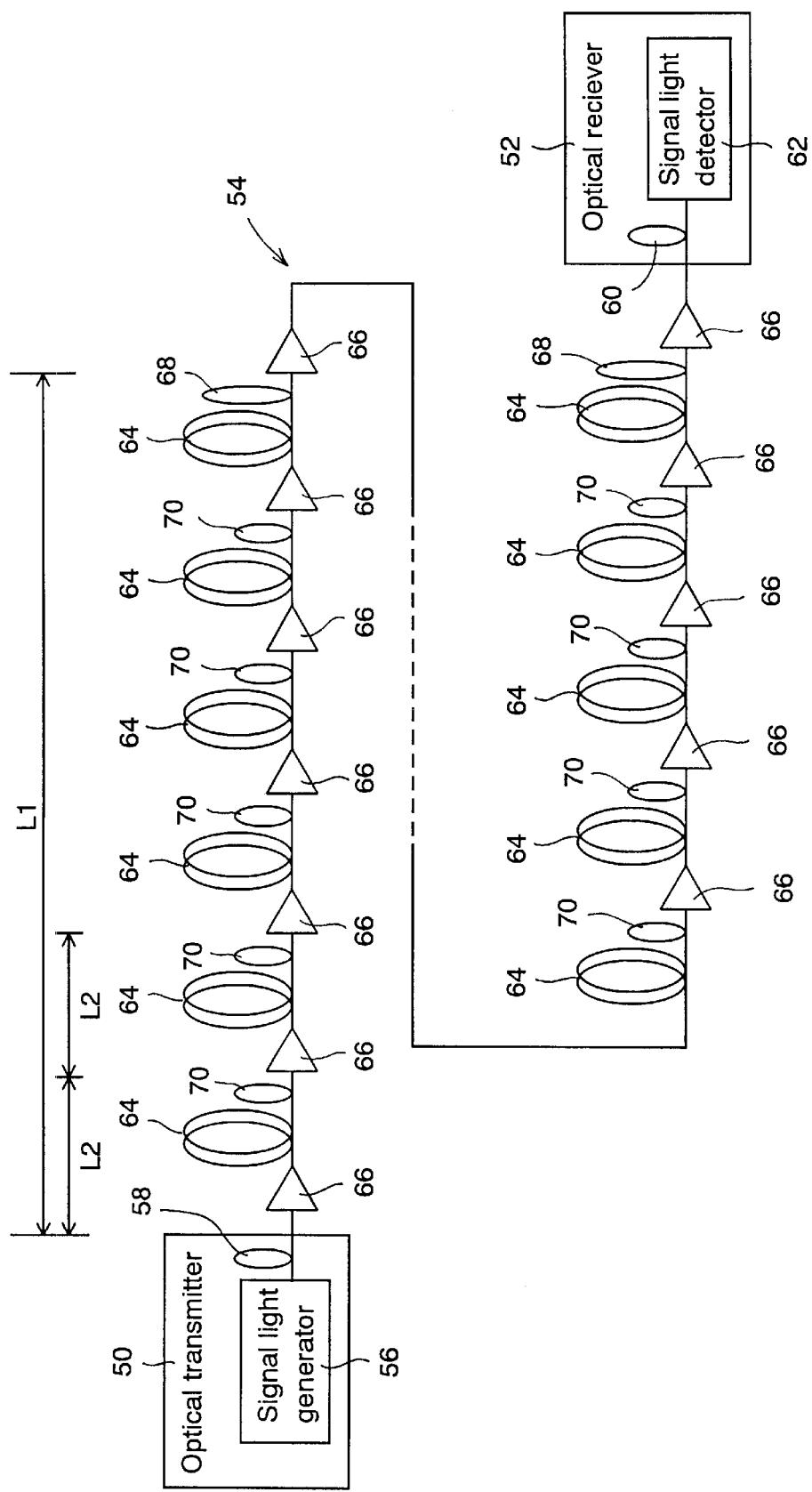
FIG. 4 shows a schematic block diagram according to a second embodiment of the invention.
Figure 5:
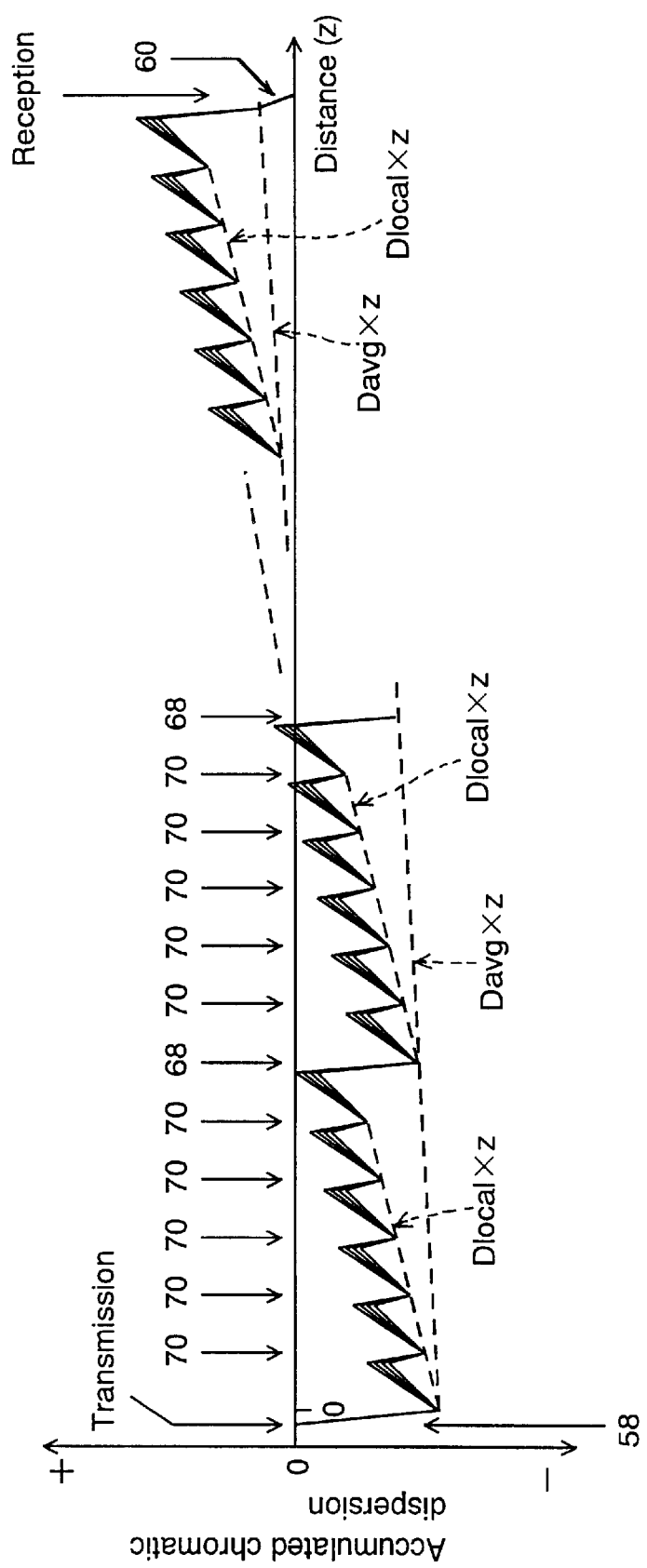
FIG. 5 is a schematic diagram showing a distance variation of the accumulated chromatic dispersion according to the embodiment shown in FIG. 4.

FIG. 4 shows a schematic block diagram according to a second embodiment of the invention in which signal light receives a chromatic dispersion before it outputs onto an optical transmission line, and FIG. 5 shows a schematic diagram of a distance variation of a accumulated chromatic dispersion.

Reference numerals 50 and 52 denote an optical transmitter and optical receiver respectively, and 54 denotes, similarly to the optical transmission line 32, a dispersion compensating optical transmission line for compensating an accumulated chromatic dispersion of each wavelength with two kinds of dispersion compensating cycles.

The optical transmitter 50 comprises a signal light generator 56 for generating WDM signal light and a dispersion pre-compensating element 58 which gives a chromatic dispersion value of a minus direction to the output light from the signal light generator 56 and sends the signal light to the transmission line 54. Preferably, the chromatic dispersion value given to the signal light in advance by the dispersion pre-compensating element 58 should be more than half of the accumulated chromatic dispersion value of the optical transmission line 54.

The optical receiver 52 comprises a dispersion post-compensating element 60 for compensating the chromatic dispersion remained in the signal light propagated on the optical transmission line 54 and a signal light detector 62 for detecting a signal in the output light from the dispersion post-compensating element 60.

As explained above, the optical transmission line 54 has the same configuration with the optical transmission line 32. Namely, the optical transmission line 54 comprises optical transmission fibers 64, optical repeating amplifiers 66, first dispersion compensation fibers 68 inserted at first dispersion compensating cycles L1, and second dispersion compensation fibers 70 inserted in optical repeating span L2 of the optical repeating amplifier 66 within the first dispersion compensating cycle L1.

As shown in FIG. 5, the first dispersion compensation fiber 68, similarly to the dispersion compensation fiber 40-6, reduces accumulated chromatic dispersion values of respective wavelengths λ1-λn into a value equal to the product derived from multiplying the Davg by a transmission distance z (Davg ×z). As shown in FIG. 5, the second dispersion compensation fiber 70, similarly to the dispersion compensation fibers 40-1~40-5, compensates accumulated chromatic dispersions (and dispersion slopes) of the respective wavelengths λ1-λn so that each accumulated chromatic dispersion of the respective wavelengths λ1-λn after the dispersion compensation varies at an incline of the Dlocal according to a distance z in the first dispersion compensating cycle L1.

Similarly to the first embodiment, the optical transmission fiber 64 comprises for example a single mode optical fiber having a zero dispersion wavelength at a 1.3 μm band. It is also applicable that the optical transmission fiber 64 in the second dispersion compensating cycle, specifically in one repeating span, comprises a single mode optical fiber having the zero dispersion wavelength at the 1.3 μm band (e.g. an optical fiber of a chromatic dispersion value +18 ps/nm/km) and a minus dispersion optical fiber or a plus dispersion optical fiber with a small dispersion value connected to the single mode fiber, and then the minus dispersion optical fibers 70 for compensating the dispersion slopes and chromatic dispersions are connected to the fiber 64. It is also preferable to gradually change the chromatic dispersion of the optical transmission fiber 64 disposed immediately before the dispersion compensation fiber 68. Owing to the gradual change, the increase of the accumulated chromatic dispersion in one repeating span is efficiently supressed and thus the transmission characteristics can be improved.

Also, when the optical transmission fiber 64 comprises a plurality of optical fibers, it is preferable to dispose each optical fiber so that its effective core area gradually reduces in the transmission direction of the signal light as well as its chromatic dispersion value approaches, in the transmission direction of the signal light, to the chromatic dispersion value of the dispersion compensation fiber 70 onthe downstream side. By this configuration, when entering the dispersion compensation fiber 70, the signal light can avoid both sudden decline of the effective core area and sudden change of the chromatic dispersion value. The optical transmission fiber 64 disposed immediately before the dispersion compensation fiber 68 also should have the same configuration.

When the signal light is output onto the optical transmission line 54 after being pre-compensated its chromatic dispersion value equal to more than half of the accumulated chromatic dispersion of the optical transmission line 54, the maximum value of the accumulated chromatic dispersion of the optical transmission line 54 can be easily suppressed. In long haul transmission such as transoceanic transmission, satisfactory transmission characteristics of the WDM transmission can be obtained.

We tested the transmission characteristics of 32 wavelength-division-multiplexed wavelengths of 10 Gb/s at a 1.5 μm band after 7300 km transmission using a recirculating test system in which one repeating span is set to approximately 47 km (the optical transmission fiber 64 is 40 km and the dispersion compensation fiber 68, 70 is approximately 7 km) and six repeating spans compose one cycle. The six repeating spans make a basic unit and the dispersion compensation fiber 70 is inserted in each of the first five repeating spans and the dispersion compensation fiber 68 is inserted in the last repeating span. The dispersion pre-compensating value by the dispersion pre-compensating element 58 is set to −1400 ps/nm. The chromatic dispersion value accumulated on the 7300 km transmission is +1830 ps/nm. When the dispersion pre-compensating amounts are set to −1000 ps/nm, −1200 ps/nm, −1600 ps/nm and −1800 ps/nm, satisfactory transmission characteristics equal to those of the −1400 ps/nm dispersion pre-compensating amount were obtained. When the dispersion pre-compensating amount is set to −800 ps/nm, a deterioration of approximately 0.5 dB in Q value is detected.

When the Dlocal is set to 0.5~3.0 ps/nm/km and the Davg is set to 0.15~0.3 ps/nm/km, satisfactory transmission characteristics are obtained at a 1.5 μm band and a bit error rate (BER) less than $10^{-9}$ can be realized. In the above-mentioned recirculating test, the transmission characteristics became the most satisfactory when the Dlocal is set to approximately 2.0 ps/nm/km and the Davg is set to approximately 0.25 ps/nm/km.

Figure 6:
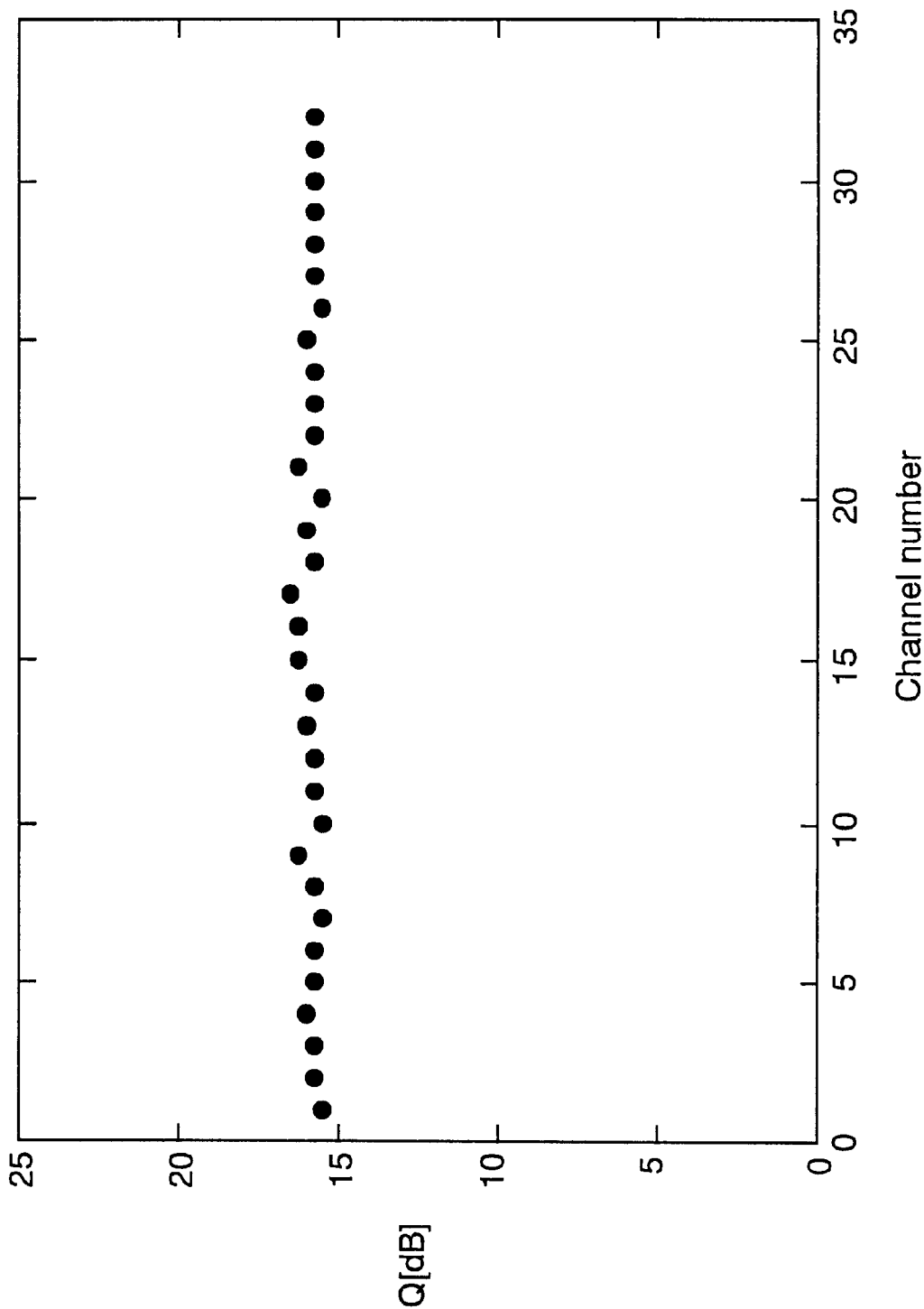
FIG. 6 shows an experimental result according to the second embodiment.
Figure 7:
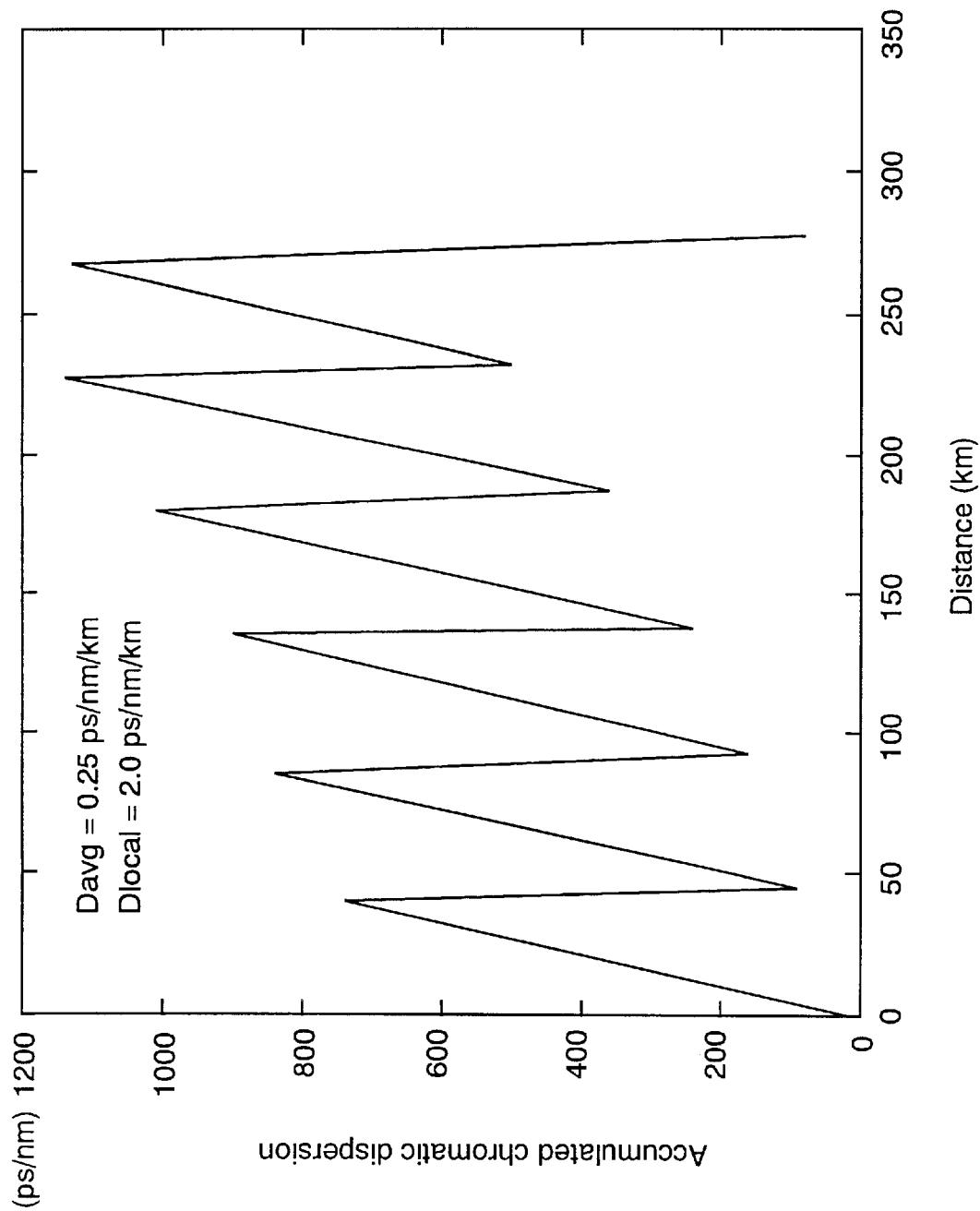
FIG. 7 shows a measured result of the distance variation of the accumulated chromatic dispersion according to the second embodiment.

FIG. 6 is an experimental result showing a Q value of each channel. In FIG. 6, horizontal and vertical axes show a wavelength (channel) and a Q value (dB) respectively. As apparent from FIG. 6, respective wavelengths show almost even characteristics. An average Q value was 15.87 dB. FIG. 7 shows a measured value of a distance change of an accumulated chromatic dispersion when the Dlocal and Davg are set to 2.0 ps/nm/km and 0.25 ps/nm/km respectively. In FIG. 7, vertical and horizontal axes show an accumulated chromatic dispersion and a transmission distance respectively. FIG. 7 shows the distance change of the accumulated chromatic dispersion of one cycle in the recirculating test. When the dispersion pre-compensation was not used, in order to obtain transmission characteristics equal to the result when the dispersion pre-compensation was used, a degree of phase modulation should be greatly increased. Accordingly, spectral width widened and therefore channel interval was required to widen. Obviously from the above fact, the dispersion pre-compensation according to the embodiment is effective for decreasing the degree of phase modulation.

Figure 8:
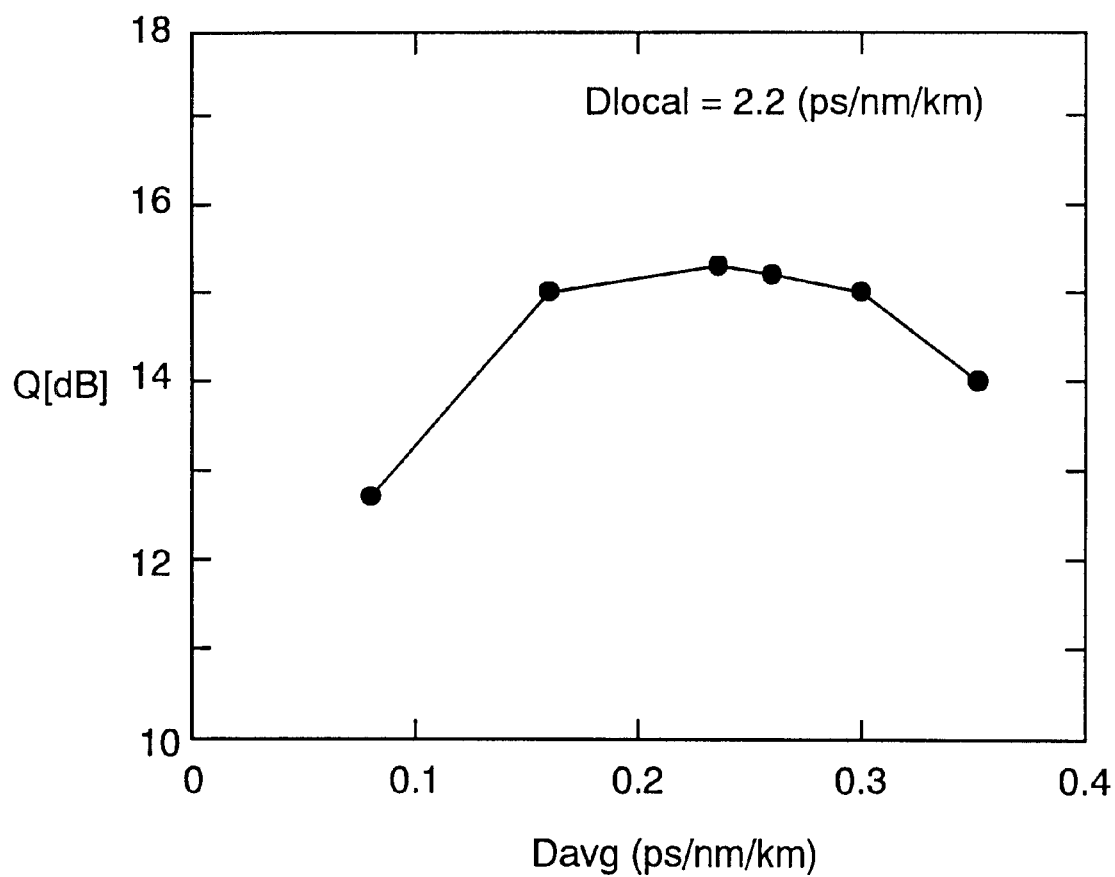
FIG. 8 shows a measured example of Q value variation relative to Davg.

A change of transmission characteristics relative to the Davg was also tested. FIG. 8 shows a measured result of Q (dB) relative to the Davg when Dlocal =2.2 ps/nm/km. The vertical and horizontal axes denote Q (dB) and Davg respectively. A similar mountain-shaped result was obtained when Dlocal =1.5 ps/nm/km. When the optimum range of the Davg is defined as a range in which Q value is dropped 1 dB from its optimum value, the Davg should be set to 0.15~0.3 ps/nm/km.

In the above embodiment, the dispersion compensation fibers 40-1~40-6, 68 and 70 compensate the difference of accumulated chromatic dispersions among the respective wavelengths, namely compensate the accumulated chromatic dispersions of the respective wavelengths λ1–λn so that the dispersion slope becomes zero. The above description, however, is an ideal condition for making clearly understandable. This invention is applicable to a wide range of dispersion compensating transmission systems for compensating chromatic dispersion, and it is not an indispensable condition for the invention that a dispersion slope becomes absolutely zero on an optical transmission line.

Figure 9:
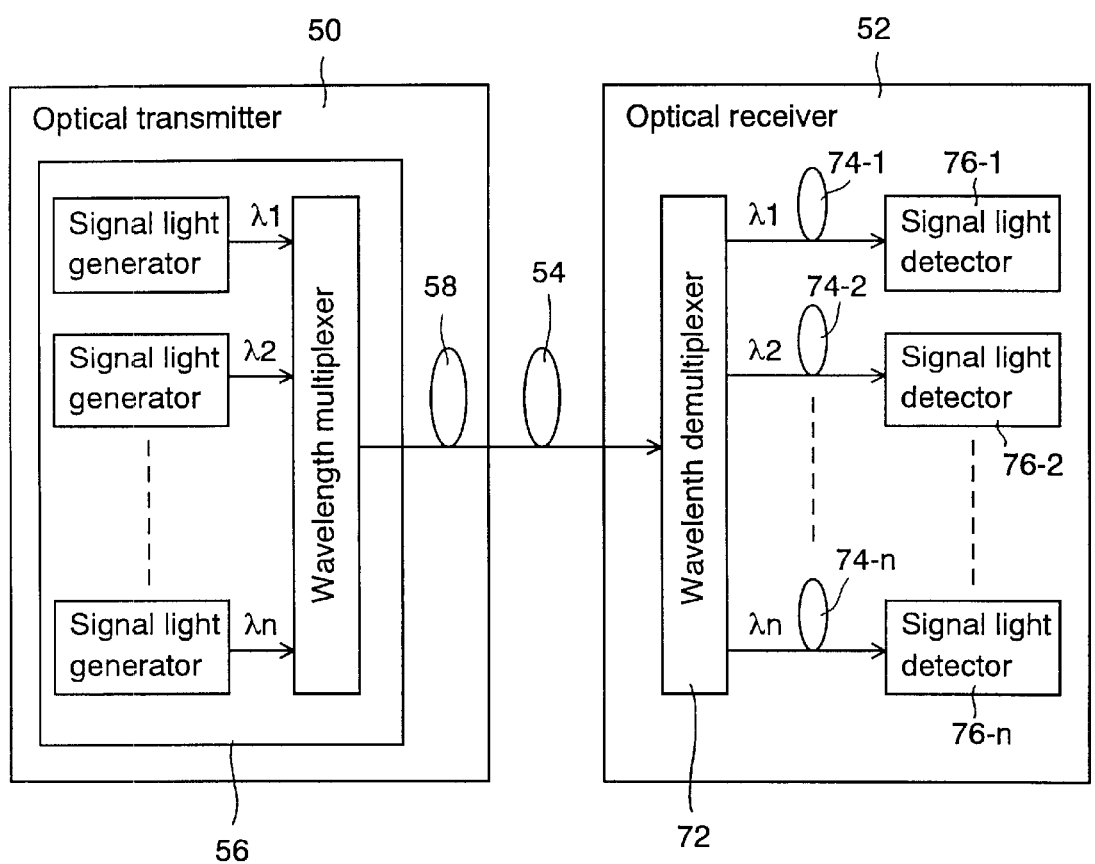
FIG. 9 is a schematic block diagram of a modified example of an optical receiver 62.

When the accumulated chromatic dispersions of the respective wavelengths λ1–λn differ from one another on the optical transmission line 54, especially at an output stage of the optical transmission line 54, each accumulated chromatic dispersion of the respective wavelengths λ1–λn can be compensated in the optical receiver 52. FIG. 9 shows a schematic block diagram of such modified optical receiver 52. A wavelength demultiplexer 72 demultiplexes the signal light from the optical transmission line 54 into components of the respective wavelengths λ1–λn. The demultiplexed signal light of the respective wave lengths λ1–λn is input to signal light detectors 76-1–76-n through dispersion compensators 74-1–74-n. Each dispersion compensation amount of the dispersion compensators 74-1–74-n is individually controlled so that the accumulated chromatic dispersions of the respective wavelengths becomes a predetermined constant value. When the accumulated chromatic dispersions of the respective wavelengths λ1–λn differ from one another after the dispersion compensations by the dispersion compensation fibers 68 and 70 on the optical transmission line 54, the accumulated chromatic dispersions of the respective wavelengths can be equalized to a constant value by the dispersion compensators 74-1–74-n.

Explained above is an example in which the accumulated chromatic dispersion increases in the plus direction. However, obviously, the present invention is also applicable to a case that the accumulated chromatic dispersion increases in a minus direction.

The dispersion compensator can comprise a chirped fiber grating as well as the above-mentioned SCDCF, and moreover can comprises an optical planar circuit in addition to the fiber types.

In the above, although the embodiment of the two-stage dispersion compensation was entirely described, a dispersion compensation of a three-stage and over also brings equal or even better operation advantages. It is preferable that the accumulated chromatic dispersion is compensated to zero on the middle point of the optical transmission line.

As readily understandable from the aforementioned description, according to the invention, the satisfactory long haul transmission characteristics can be realized and at the same time the dispersion control becomes easier. Especially, the invention brings excellent transmission characteristics in WDM transmission.

While the invention has been described with reference to the specific embodiment, it will be apparent to those skilled in the art that various changes and modifications can be made to the specific embodiment without departing from the spirit and scope of the invention as defined in the claims.

What is claimed is:

1. A dispersion compensating optical transmission line comprising:
    a plurality of optical transmission fibers for transmitting signal light;
    at least one first dispersion compensator disposed at a first dispersion compensating cycle for compensating an accumulated chromatic dispersion of the signal light so that a first average chromatic dispersion is equal to a first desired value; and
    a plurality of second dispersion compensators disposed at a second dispersion compensating cycle shorter than the first dispersion compensating cycle for compensating the accumulated chromatic dispersion of the signal light so that a second average chromatic dispersion is equal to a second desired value which absolute value is larger than that of the first desired value.

2. The dispersion compensating optical transmission line of claim 1 further comprising an optical repeating amplifier disposed at the second dispersion compensating cycle.

3. The dispersion compensating optical transmission line of claim 1 wherein each of the optical transmission fibers comprises a single mode optical fiber.

4. The dispersion compensating optical transmission line of claim 1 wherein the optical transmission fiber in the second dispersion compensating cycle comprises a plurality of the optical fibers which effective core areas gradually reduce in a transmission direction of the signal light and which chromatic dispersion values approach to that of each of the second dispersion compensators on a downstream side in the transmission direction of the signal light.

5. The dispersion compensating optical transmission line of claim 1 wherein the signal light comprises a wavelength-division-multiplexed signal light obtained by wavelength-multiplexing the signal light with a plurality of wavelengths.

6. The dispersion compensating optical transmission line of claim 5 wherein the first dispersion compensator removes differences of accumulated chromatic dispersion values among the respective wavelengths.

7. The dispersion compensating optical transmission line of claim 5 or 6 wherein each of the second dispersion compensators removes differences of accumulated chromatic dispersion values of the respective wavelengths.

8. A dispersion compensating optical transmission line comprising:
    a first dispersion compensation interval having a first optical transmission fiber for transmitting signal light and a first dispersion compensator for compensating an accumulated chromatic dispersion of the signal light so that a first average chromatic dispersion is equal to a first desired value; and
    a plurality of second dispersion compensation intervals continuously disposed before the first dispersion compensation interval, each of the second dispersion compensation intervals having a second optical transmission fiber for transmitting the signal light and a second dispersion compensator for compensating an accumulated chromatic dispersion of the signal light so that a second average chromatic dispersion is equal to a second desired value which absolute value is larger than that of the first desired value.

9. The dispersion compensating optical transmission line of claim 8 wherein the first optical transmission fiber and the second optical transmission fiber are each a single mode optical fiber.

10. The dispersion compensating optical transmission line of claim 8 wherein the signal light comprises a wavelength-division-multiplexed signal light obtained by wavelength-multiplexing the signal light with a plurality of wavelengths.

11. The dispersion compensating optical transmission line of claim 8 wherein the first dispersion compensator removes differences of accumulated chromatic dispersion values among the respective wavelengths.

12. The dispersion compensating optical transmission line of claim 8 wherein each of the second dispersion compensators removes differences of accumulated chromatic dispersion values of the respective wavelengths.

13. A dispersion compensating optical transmission system comprising:
    an optical transmitter for outputting signal light;
    optical transmission fiber for transmitting the signal light;
    at least one first dispersion compensator disposed on the optical transmission fiber at a first dispersion compensating cycle for compensating an accumulated chromatic dispersion of the signal light so that a first average chromatic dispersion is equal to a first desired value;
    a plurality of second dispersion compensators disposed on the optical transmission fiber at a second dispersion compensating cycle shorter than the first dispersion compensating cycle for compensating an accumulated chromatic dispersion of the signal light so that a second average chromatic dispersion is equal to a second desired value which absolute value is larger than that of the first desired value; and an optical receiver for receiving the signal light propagated on the optical transmission fiber.

14. The dispersion compensating optical transmission system of claim 13 further comprising optical repeating amplifiers disposed at the second dispersion compensating cycle.

15. The dispersion compensating optical transmission system of claim 13 wherein the optical transmission fiber comprises a single mode optical fiber.

16. The dispersion compensating optical transmission system of claim 13 wherein the optical transmission fiber in the second dispersion compensating cycle comprises a plurality of the optical fibers which effective core areas gradually reduce in a transmission direction of the signal light and which chromatic dispersion values approach to that of each of the second dispersion compensators on a downstream side in the transmission direction of the signal light.

17. The dispersion compensating optical transmission system of claim 13 wherein the signal light comprises a wavelength-division-multiplexed signal light obtained by wavelength-multiplexing the signal light with a plurality of wavelengths.

18. The dispersion compensating optical transmission system of claim 17 wherein the first dispersion compensator removes differences of accumulated chromatic dispersion values among the respective wavelengths.

19. The dispersion compensating optical transmission system of claim 17 or 18 wherein each of the second dispersion compensators removes differences of accumulated chromatic dispersion values of the respective wavelengths.

20. The dispersion compensating optical transmission system of claim 13 wherein the optical transmitter comprises a dispersion pre-compensator for giving a chromatic dispersion of a predetermined amount to the signal light and the optical receiver comprises a dispersion post-compensator for finally compensating an accumulated chromatic dispersion of the input signal light.

21. The dispersion compensating optical transmission system of claim 20 wherein the predetermined chromatic dispersion of the dispersion pre-compensator is equal to an amount more than half of the accumulated chromatic dispersion stored in the optical transmission from the optical transmitter to the optical receiver.

22. A dispersion compensating optical transmission line comprising:
   an optical transmission fiber to transmit signal light;
   at least one first dispersion compensator disposed at a first dispersion compensating interval on the optical transmission fiber to compensate an accumulated chromatic dispersion of the signal light so that a first average chromatic dispersion is equal to a first value; and
   a plurality of second dispersion compensators disposed on the optical transmission fiber and spaced apart from one another at a second dispersion compensating interval shorter than the first dispersion compensating interval to compensate the accumulated chromatic dispersion of the signal light so that a second average chromatic dispersion is equal to a second value having an absolute value larger than that of the first value.

23. The dispersion compensating optical transmission line of claim 22 further comprising a plurality of optical repeating amplifiers disposed on the optical transmission fiber and spaced apart from one another at the second dispersion compensating interval.

24. The dispersion compensating optical transmission line of claim 22 wherein the transmission optical fiber comprise a single mode optical fiber.

25. The dispersion compensating optical transmission line of claim 22 wherein the optical transmission fiber comprises a plurality of optical fibers each having an effective core area that reduces relative to the other optical fibers in a transmission direction of the signal light, and a chromatic dispersion value which approaches that of each of the second dispersion compensators on a downstream side in the transmission direction of the signal light.

26. The dispersion compensating optical transmission line of claim 22 wherein the signal light comprises a wavelength-division-multiplexed signal light having a plurality of wavelengths.

27. The dispersion compensating optical transmission line of claim 26 wherein the first dispersion compensator removes accumulated chromatic dispersion differences among the respective wavelengths.

28. The dispersion compensating optical transmission line of claim 26 or 27 wherein each of the second dispersion compensators removes accumulated chromatic dispersion differences among the respective wavelengths.

29. A dispersion compensating optical transmission line comprising:
   an optical transmission fiber to transmit signal light;
   a first dispersion compensation interval along the optical transmission fiber and a first dispersion compensator to compensate an accumulated chromatic dispersion of the signal light so that an average chromatic dispersion is equal to a first value; and
   a plurality of second dispersion compensation intervals disposed in the first dispersion compensation interval, each of the second dispersion compensation intervals having a second dispersion compensator to compensate the accumulated chromatic dispersion of the signal light so that an average chromatic dispersion is equal to a second value having an absolute value larger than that of the first value.

30. The dispersion compensating optical transmission line of claim 29 wherein the optical transmission fiber comprises a single mode optical fiber.

31. The dispersion compensating optical transmission line of claim 29 wherein the optical transmission fiber comprises an optical fiber in each of the second dispersion compensating intervals, each of the optical fibers having an effective core area that reduces with respect to the other optical fibers in a transmission direction of the signal light, and a chromatic dispersion value which approaches that of each of the second dispersion compensators on a downstream side in the transmission direction of the signal light.

32. The dispersion compensating optical transmission line of claim 29 wherein the signal light comprises a wavelength-division-multiplexed signal light having a plurality of wavelengths.

33. The dispersion compensating optical transmission line of claim 32 wherein the first dispersion compensator removes accumulated chromatic dispersion differences among the respective wavelengths.

34. The dispersion compensating optical transmission line of claim 32 or 33 wherein each of the second dispersion compensators removes accumulated chromatic dispersion differences among the respective wavelengths.

35. A dispersion compensating optical transmission system comprising:
   an optical transmission fiber;
   an optical transmitter to output signal light on the optical transmission fiber;
   at least one first dispersion compensator disposed on the optical transmission fiber at a first dispersion compensating interval to compensate an accumulated chromatic dispersion of the signal light so that an average chromatic dispersion is equal to a first value;

a plurality of second dispersion compensators disposed on the optical fiber spaced apart from one another at a second dispersion compensating interval shorter than the first dispersion compensating interval to compensate the accumulated chromatic dispersion of the signal light so that an average chromatic dispersion is equal to a second value having an absolute value larger than that of the first value; and an optical receiver to receive the signal light from the optical transmission fiber.

36. The dispersion compensating optical transmission system of claim 35 further comprising a plurality of optical repeating amplifiers each spaced apart from one another at the second dispersion compensating interval.

37. The dispersion compensating optical transmission system of claim 35 wherein the optical transmission fiber comprises a single mode optical fiber.

38. The dispersion compensating optical transmission system of claim 35 wherein the optical transmission fiber comprises a plurality of the optical fibers each having an effective core area that reduces with respect to the other optical fibers in a transmission direction of the signal light, and a chromatic dispersion value which approaches that of each of the second dispersion compensators on a downstream side in the transmission direction of the signal light.

39. The dispersion compensating optical transmission system of claim 35 wherein the signal light comprises a wavelength-division-multiplexed signal light having a plurality of wavelengths.

40. The dispersion compensating optical transmission system of claim 39 wherein the first dispersion compensator removes accumulated chromatic dispersion differences among the respective wavelengths.

41. The dispersion compensating optical transmission system of claim 39 or 40 wherein each of the second dispersion compensators removes accumulated chromatic dispersion differences among the respective wavelengths.

42. The dispersion compensating optical transmission system of claim 35 wherein the optical transmitter comprises a dispersion pre-compensator to give a predetermined chromatic dispersion to the signal light, and the optical receiver comprises a dispersion post-compensator to compensate the accumulated chromatic dispersion of the signal light.

43. The dispersion compensating optical transmission system of claim 42 wherein the predetermined chromatic dispersion is greater than half of the accumulated chromatic dispersion of the optical transmission fiber.

* * * * *